US009282575B2

(12) United States Patent
Vukovic et al.

(10) Patent No.: US 9,282,575 B2
(45) Date of Patent: Mar. 8, 2016

(54) REDUCING ACCESS CHANNEL DELAY IN A WIRELESS COMMUNICATION SYSTEM (75) Inventors: Ivan N. Vukovic, Arlington Heights, IL (US); Igor Filipovich, Chicago, IL (US); Kay M. Kurio, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 861 days.

(21) Appl. No.: 12/709,538

(22) Filed: Feb. 22, 2010

(65) Prior Publication Data
US 2010/0238859 A1 Sep. 23, 2010

Related U.S. Application Data (60) Provisional application No. 61/161,086, filed on Mar. 18, 2009.

(51) Int. Cl.
*H04L 12/413* (2006.01)
*H04W 74/08* (2009.01)

(52) U.S. Cl.
CPC .................. *H04W 74/0833* (2013.01)

(58) Field of Classification Search
CPC .......................... H04W 74/0833; H04W 74/00
USPC ......... 370/216, 322, 328, 329, 330, 445, 447, 370/448, 461, 462; 455/450–509
See application file for complete search history.

(56) References Cited

U.S. PATENT DOCUMENTS

2009/0201798 A1* 8/2009 Lee et al. ...................... 370/216

FOREIGN PATENT DOCUMENTS

| CN | 1314747 A | 9/2001 | |
|---|---|---|---|
| CN | 1316866 A | 10/2001 | |
| CN | 1957625 A | 5/2007 | |
| KR | WO 2008156315 A2 * | 12/2008 | ........ H04W 74/0833 |
| WO | 2008156315 A2 | 12/2008 | |

OTHER PUBLICATIONS

3GPP TS 36.321 v8.4.0 (Dec. 2008), "3rd Generation Partnership Project; Technical Specification Group Radio Access Network; Evolved Universal Terrestrial RAdio Access (E-UTRA) Medium Access Control (MAC) protocol specification", all pages.
Marcus Kahl, Corresponding Application PCT/US2010/026137—PCT International Search Report and Written Opinion, WIPO, ISA/EP, European Patent Office, Rijswijk, Netherlands, May 31, 2010, 14 pages, most relevant pp. 5-6 and 10-12.

(Continued)

*Primary Examiner* — Mang Yeung
(74) *Attorney, Agent, or Firm* — Schwabe, Williamson & Wyatt, P.C.

(57) ABSTRACT

A system and method for reducing access channel delay in a wireless communication system includes a step 601 of sending an initial access request response that includes identifiers of any initial access requests, including an indicator that indicates whether any more responses with identifiers are going to be sent within a predefined time period. A next step 602 includes receiving the response. A next step 604 includes recognizing that a particular identifier from the initial access request is not in the response. A next step 606 includes determining from the indicator that there will be no more responses with identifiers sent within the predefined time period. A next step 608 includes transmitting another initial access request before the end of the predefined time period.

18 Claims, 6 Drawing Sheets

(56) References Cited

OTHER PUBLICATIONS

"3GPP TS 36.321 v8.4.0 (Dec. 2008) Technical Specification, 3rd Generation Partnership Project; Technical Specification Group Radio Access Network; Evolved Universal Terrestrial Radio Access (E-UTRA) Medium Access Control (MAC) Protocol Specification (Release 8)," Dec. 30, 2008, pp. 1-43.

Interdigital, "Physical Non-Synchronized Random Access Procedure—R1-063459," 3rd Generation Partnership Project (3GPP), 3GPP TSG RAN1 #47, Riga, Latvia, Nov. 6-10, 2006, 4 pages.

ZTE, "Message 3 Aspect for DL Data Arrival Case—R2-080028," 3rd Generation Partnership Project (3GPP), 3GPP TSG RAN WG2 #60bis, Seville, Spain, Jan. 14-18, 2008, 6 pages.

Motorola, "Non-Synchronized Random Access Physical Layer Procedure—R1-063044," 3rd Generation Partnership Project (3GPP), 3GPP TSG RAN1 #47, Riga, Latvia, Nov. 6-10, 2006, 4 pages.

Office Action received in Chinese Patent Application No. 201080012401.9, issued Aug. 13, 2013.

Chinese Patent Office; Third Office Action in Chinese App. No. 201080012401.9 issued Sep. 10, 2014; 19 pages inclusive of English translation.

Second Office Action received in Chinese Patent Application No. 201080012401.9, issued Mar. 19, 2014.

Chinese Patent Office; Decision on Rejection in Chinese App. No. 201080012401.9 issued Apr. 7, 2015; 16 pages inclusive of English translation.

* cited by examiner

REDUCING ACCESS CHANNEL DELAY IN A WIRELESS COMMUNICATION SYSTEM

TECHNICAL FIELD OF THE INVENTION

This invention relates generally to wireless communications and more particularly to access channel delay in a wireless communication system.

BACKGROUND OF THE INVENTION

Various communications protocols are known in the art. For example, the Third Generation Partnership Project (3GPP) has been working towards developing a number of protocols for use with a wireless communication path. The original scope of 3GPP was to produce globally applicable technical specifications and technical reports for a 3rd generation mobile system based on evolved Global System for Mobile (GSM) communication core networks and the radio access technologies that they support, such as Evolved Universal Terrestrial Radio Access (EUTRA) including both Frequency Division Duplex (FDD) and Time Division Duplex (TDD) modes. 3GPP's scope was subsequently amended to include the maintenance and development of GSM technical specifications and technical reports including evolved radio access technologies (e.g. General Packet Radio Service (GPRS) and Enhanced Data rates for GSM Evolution (EDGE)). Since then, Fourth Generation (4G) systems have arisen that borrow portions of the protocols from earlier 3G systems.

Presently, EUTRA calls for a random access channel (RACH) protocol and in particular a physical random access procedure requiring reserved resources for RACH access. The RACH channel is used for initial access to the network as well as to transmit small to medium amount of control information and data packets. This 3GPP specification permits an overall procedure that allows for various protocol/operational states to suit varying degrees of needed, anticipated, and/or desired operational activity for transmission of data packets. The RACH (random access channel) is essential for access to the network, for the transmission of control information and data packets. The access channel has different names in different systems, such as RACH in the context of 3GPP and now Long Term Evolution (LTE or 4G), or ranging in the context of IEEE 802.16e and now WiMAX (IEEE 802.16m) using Code Division Multiple Access (CDMA), for example. In the description herein, the LTE implementation of RACH is used, for example, in its general sense to represent the ranging or access channel of various communication systems.

In the current LTE standard, random access consists of a message exchange between a mobile station or user equipment (UE) and a base station or enhanced NodeB (eNB), wherein a UE sends a Preamble or Message 1, and the eNB sends a RACH Response (RAR) or Message 2 acknowledging the Preamble transmission by the UE by indicating in the RAR a unique Preamble identifier associated with each Preamble. Due to scheduling and congestion issues in the downlink eNB is given a window of time to send the RAR. This is defined as a RAR window, which is a window that is configurable between two to ten milliseconds, depending upon the choice of system parameters. The UE is required to monitor the whole RAR window to detect if the eNB has acknowledged its Preamble identifier.

The RAR sent by the eNB is to be received by all UEs that transmitted Message 1 in the current RACH opportunity (i.e. RAR window). However, it is possible that, due to resource limitations in a sub-frame, the eNB sends responses only for a subset of detected Preambles sent by the UEs while the rest of the detected Preambles are acknowledged in subsequent sub-frames within the RAR window for this RACH opportunity. In this case, if the UE did not detect its Preamble identifier in the first Message 2 (i.e. RAR message) it receives, e.g., at the beginning of the RAR window, then the UE will still need to monitor for potential subsequent Message 2s until the end of the RAR window. If the UE does not see its Preamble identifier in any of the Message 2s in the RAR window, it must then restart Random Access Procedure and retransmit its Preamble (i.e. Message 1) again. This continued monitoring until the end of the RAR window by the UE introduces additional delay (e.g. 10 ms) for any UE that would never receive its Preamble identifier in any of the Message 2s within the RAR window and would therefore need to retransmit its Preamble anyway.

Therefore, it would be beneficial if the UE could detect earlier that its Preamble transmission was not received by the eNB (e.g. insufficient Preamble transmission power), or was received by the eNB but the eNB due to congestion or other issues decided not to acknowledge UE's Preamble transmission in message 2, and would therefore not need to wait until the end of the whole RAR window before it can retransmit its Preamble.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

The present invention provides a technique for a UE to detect earlier in time that its access request was not received by an eNB. In this way, the UE would therefore not need to wait until the end of the whole RAR window before it can retransmit its access request.

Figure 1:
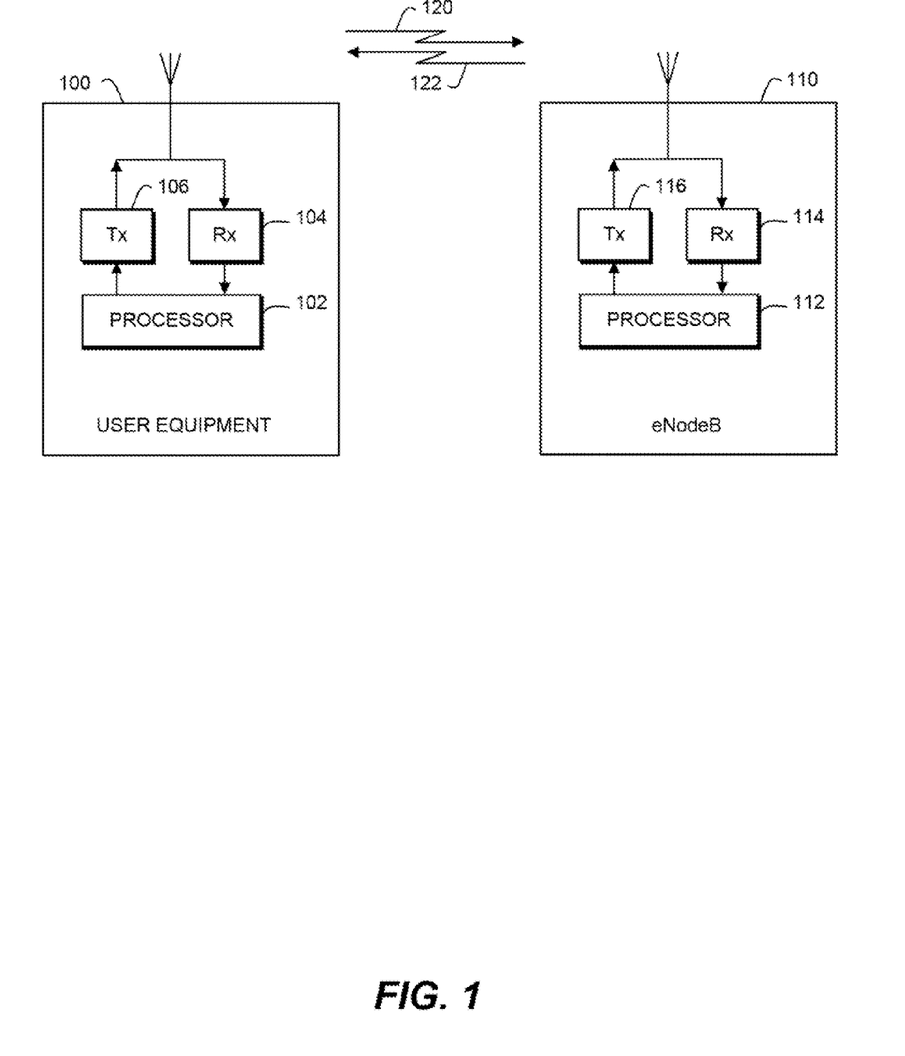
FIG. 1 illustrate a system for reducing access channel delay, in accordance with the present invention.

Referring to FIG. 1, the present invention provides a system for reducing access channel delay between a user equipment (UE) and a Node-B, such as in a LTE communication system for example. However it should be recognized that the present invention is applicable to other systems including 3GPP, 3GPP2, EUTRA, and 802.16x communication systems, and that the terms 'user equipment' can be used interchangeably with 'mobile station', and that the terms 'base station', 'base transceiver station (BTS)', 'node-B', and 'enhanced NodeB (eNB)' can be used interchangeably, as are known in the art. The UE 100 includes a transmitter 106, receiver 104, and processor 102 coupled thereto. The eNB 110 also includes a transmitter 116, receiver 114, and processor 112 coupled thereto. The UE is operable to send a request 120 on an access channel to the eNB 110, such as a preamble in a random access channel in the LTE system or a ranging request in the WiMAX system, for example. The eNB 110 is operable to return an acknowledgment message 122 to the UE 100, such as a random access response in the LTE system or a ranging response in the WiMAX system, for example.

Figure 2:
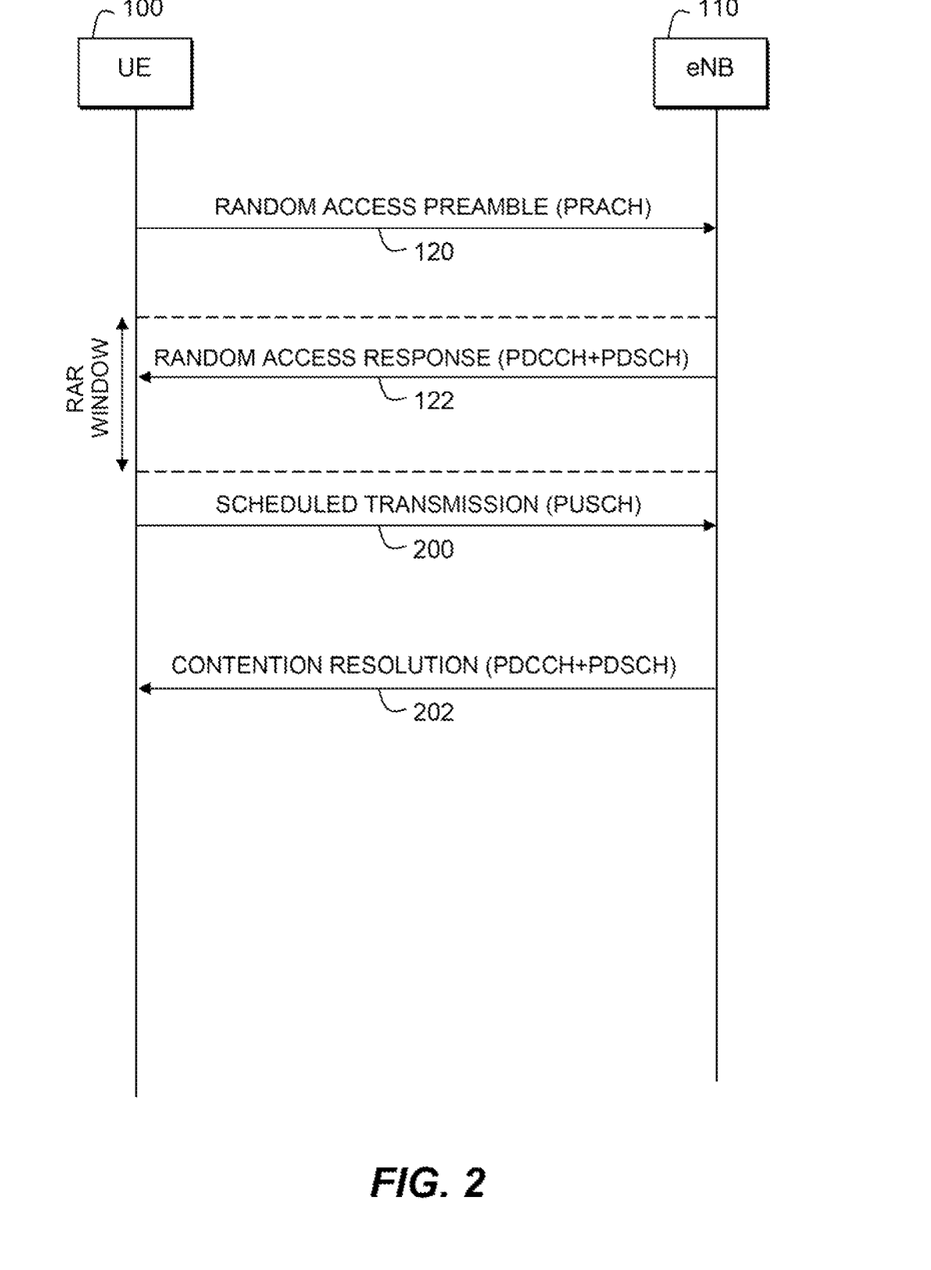
FIG. 2 illustrates an LTE RACH call flow.

Referring to FIGS. 1 and 2, in order to communicate with an eNB 110, a processor 102 of the UE 100 selects a signature code sequence (referred to as Random Access Preamble in LTE system), which acts as an identifier for the UE. The processor 102 then determines an available RACH access slot and other transmission parameters, including a transmission power. The processor 102 of the UE 100 directs the transmitter 106 to transmit 120 the RACH preamble (e.g. Message 1 in LTE) using the selected slot, signature sequence, and power on the physical random access channel (PRACH). It should be noted that multiple UEs may attempt to contact the eNB in this manner at the same time using the same signature sequence. A receiver 114 of the eNB 110 may or may not detect the RACH preamble from the UE 100, due to poor signal conditions, for example. In addition, the receiver 114 may receive multiple RACH preambles from different UEs, which the processor 112 then may not be able to discriminate due to confusion or collision.

In order to respond to requesting UEs, the processor 112 of the eNB 110 assembles a list of all RACH preamble identifiers (or signature sequences) that the processor was able to detect. The processor 112 responds to the request(s) by directing the transmitter 116 to transmit a random access response (RAR) broadcast 122 (e.g. Message 2 in LTE), which is indicated on a physical downlink control channel (PDCCH) with a pointer address to the actual message in a physical downlink shared channel (PDSCH). The RAR broadcast is semi-synchronous (within the flexible RAR window) with the request 120. The RAR broadcast 122 does not use Hybrid Automatic Repeat Request (HARM), so if a UE does not receive the broadcast, it must eventually repeat its request. The RAR broadcast 122 is intended for one or multiple UEs and can contain the RACH preamble identifiers used by all the requesting UEs. In some cases, the eNB 110 will not be able to include all the preamble identifiers used in this RACH access slot or RACH opportunity by the accessing UE(s) in one broadcast, and will send an additional RAR broadcast(s) within the RAR window. This scenario is addressed in accordance with the present invention below. The receiver 104 of the UE(s) 100 receives the RAR broadcast(s) which is interpreted by the processor 102. The RAR broadcast(s) not only includes the requesting UE identities, but also includes an uplink grant schedule, timing information, and power control information for the requesting UE(s) 100.

If the UE 100 recognizes the identity of the signature sequence it used to transmit Random Access Request (e.g. Message 1 in LTE system) in the RAR message 122, it can send e.g. a Radio Resource Control (RRC) connection request 200 (e.g. Message 3 in LTE) to the eNB 110 in a physical uplink shared channel (PUSCH) in the uplink resources indicated in the uplink grant schedule as part of the RAR message 122. The eNB 110 can respond to this in a RRC contention resolution 202 (e.g. Message 4 in LTE) to the UE 100, which is indicated on the physical downlink control channel (PDCCH) with a pointer address to the actual message in the physical downlink shared channel (PDSCH). However, if the UE 100 does not recognize its identity in the RAR message it must wait to see if it's identity is sent in any other RAR message that may be sent by the eNB 110 within the RAR window, thereby delaying any possible future request 120 for access until the end of the RAR window, which problem is addressed by the present invention as described below.

Figure 3:
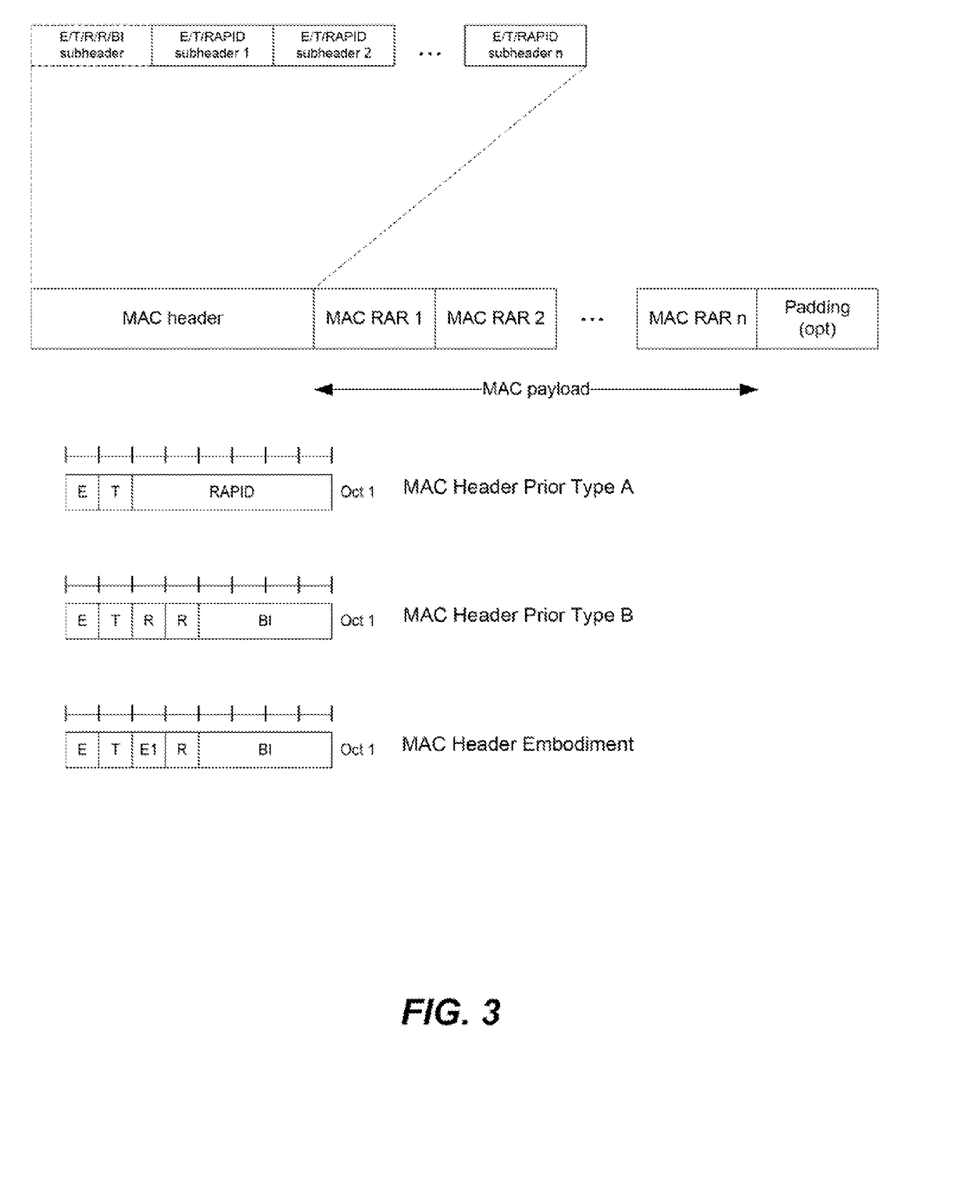
FIG. 3 illustrates a structure of the RAR message of FIG. 1, in comparison to an embodiment of the present invention.

Referring to FIG. 3, and as described in LTE TS 36.321 (release 8), section 6, the RAR message 122 (referred to also as Message 2 in LTE) has the shown format which consists of a Media Access Control (MAC) header and individual RAR responses corresponding to a detected preamble from one or more UEs. The MAC header can consist of two types of sub-headers, Type A and Type B as shown, where 'E' is the Extension field that is a flag indicating if more fields are present in the MAC header or not. The E field set to "1" indicates another set of at least E/T/RAPID or E/T/R/R/BI fields. The E field set to "0" indicates that a MAC RAR starts at the next byte; T is the Type field that is a flag indicating whether the MAC subheader contains a Random Access ID or a Backoff Indicator; R is a Reserved bit; BI is the Backoff Indicator field that identifies the overload condition in the cell; and RAPID is the Random Access Preamble IDentitfier field that identifies the transmitted (by the UE(s))/detected (the eNB) Random Access Preamble. MAC RAR contains the actual eNodeB response to an actual preamble transmission (it contains UL timing advance, UL grant, and temporary MAC layer UE identifier).

Figure 4:
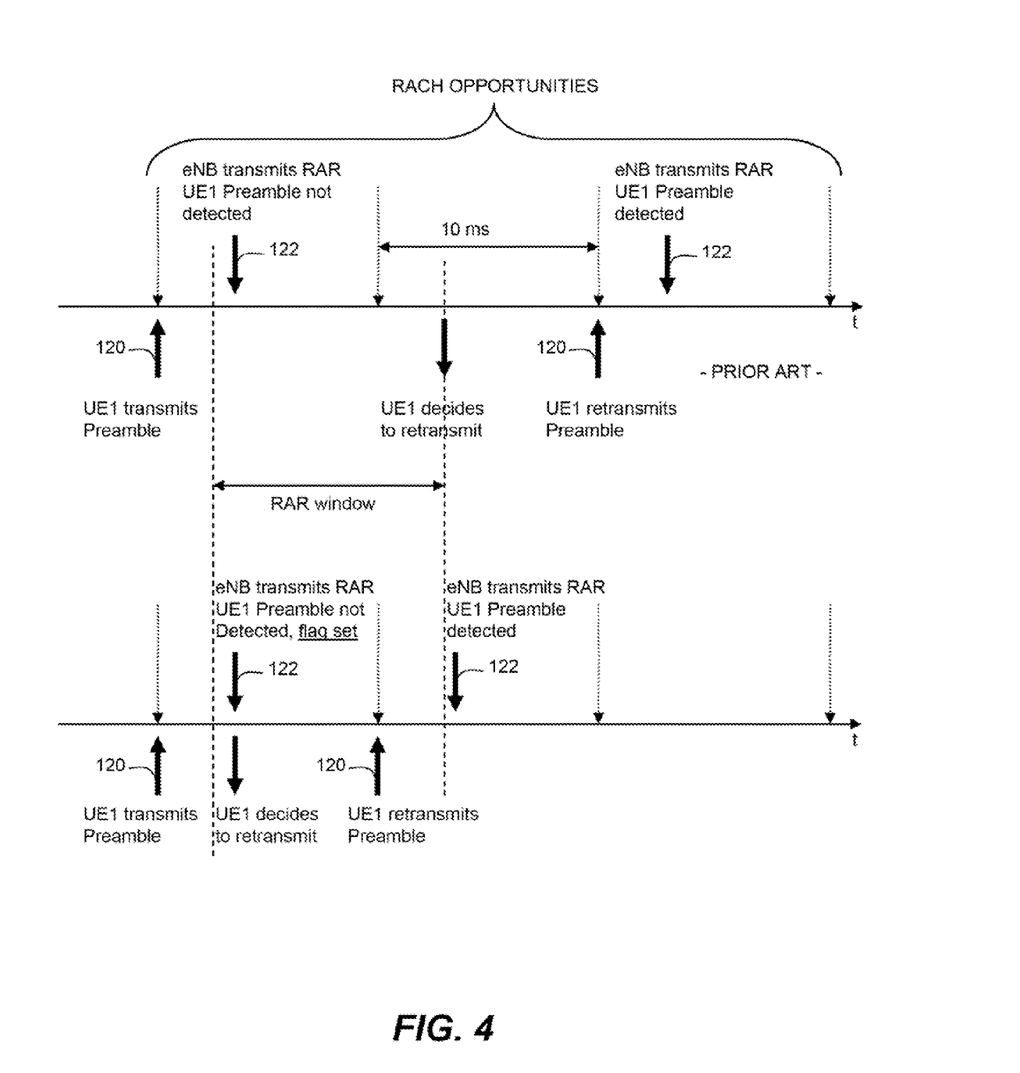
FIG. 4 illustrates a timing diagram of the call flow of FIG. 1, in comparison to an embodiment of the present invention.

Referring to the top of FIG. 4, in the prior art, when a UE transmitted its preamble 120, and received a RAR message 122 back from the eNB that did not contain the identity of the transmitted preamble, then the UE must wait for any other RAR messages that the eNB could transmit that might contain the transmitted preamble identity, at least until the end of the RAR window, before the UE decides that the eNB did not receive its original request 120. At this point the UE must wait until the next RACH opportunity to send a request 120 that the eNB can acknowledge 122. In this case the access delay (assuming successful preamble detection and prompt RAR transmission by eNB) is about 23 milliseconds.

Referring to the bottom of FIG. 4, in accordance with the present invention, a flag or indicator is included in the RAR message 122 that indicates that there are no more RAR messages planned by the eNB for the remainder of the RAR window. In this case, if the UE received a RAR message 122 back from the eNB that did not contain the preamble identity the UE has transmitted, and the RAR message includes an indicator that there are no more RAR messages being sent by the eNB within that RAR window, then the UE can immediately conclude that the eNB did not receive its original request 120, and the UE can plan to retransmit its request 120 at the next RACH opportunity, which is within the RAR window, thereby saving ten milliseconds of access delay over the prior art, in this example, for the eNB to send an acknowledge 122. In this case, the access delay is about 13 milliseconds.

Accordingly, the present invention introduces a "Last-message-in-window" indicator in a RAR broadcast (e.g. Message 2 in LTE) to indicate that in the current RAR window this RAR broadcast is the last transmission related to a particular RACH opportunity. If the UE is able to read this indicator and if indicator is set and UE does not detect its Preamble identifier, then the UE immediately prepares for Preamble retransmission at the next RACH opportunity. If the UE is able to read this indicator and if indicator is set and UE does detect its Preamble identifier, then the UE can proceed with Messages 3 and 4 as in FIG. 2. If the UE is not able to read this indicator, or if the UE can read this indicator and if indicator is not set, then the UE must wait for any other potential RAR messages in the RAR window before deciding that the eNB did not receive its request and the UE must prepare for Preamble retransmission at the next RACH opportunity.

The "Last-message-in-window" indicator of the present invention can be represented in several different embodiments. In one embodiment, as shown in FIG. 3, the indicator is a flag 'E1" that takes the place of an existing reserved bit in a currently defined Control E/T/R/R/BI subheader of the MAC header. In this case, if the E1 bit is set than there are no more RAR messages to follow in the present RAR window. Specifically, the extension flag E1 indicates if more Random Access Responses are to follow within the current Random Access Response window. The E1 field is set to "0" to indicate that more RAR are to following within the current RAR window. The E1 field is set to "1" to indicate that no more RAR are to follow in the current RAR window.

In another embodiment, one of the preamble IDs (RAPID) can be reserved as an indication that no more RAR responses are to follow in the current RAR window. For example, RAPID=0 can be reserved, and if a UE sees this identity (RAPID=0) in the RAR broadcast, then the UE will know that there are no more RAR messages due in this RAR window. Alternatively, one of the Backoff Indicator values in the E/T/R/R/BI subheader can be reserved for the same purpose, e.g. BI=0.

In another embodiment, the order of identities in the RAR message can be used as the indicator that no more RA Responses are to follow. For example, RAPIDs that are ordered in decreasing order may indicate that there are no more RAR messages due in this RAR window.

In another embodiment, a repeated identity anywhere in the header can be used as the indicator that no more RA Responses are to follow. For example, if RAPIDs are present as 1, 2, 2, 4, 6, then the repeated identity '2' indicates that there are no more RAR messages due in this RAR window.

In another embodiment, a special random access radio network temporary identifier (RA-RNTI) pointer address value, RA-RNTI*, can be used as the indicator. Unlike the above example that occurs in the data region of the RAR message, this indicator can be in the control region of the air interface frame. In particular, RA-RNTI* can be used on PDCCH when indicating the RA Response, for example RA-RNTI* would equal RA-RNTI plus an offset, where the offset would be predefined to indicate that there are no more RAR messages due in this RAR window.

Figure 5:
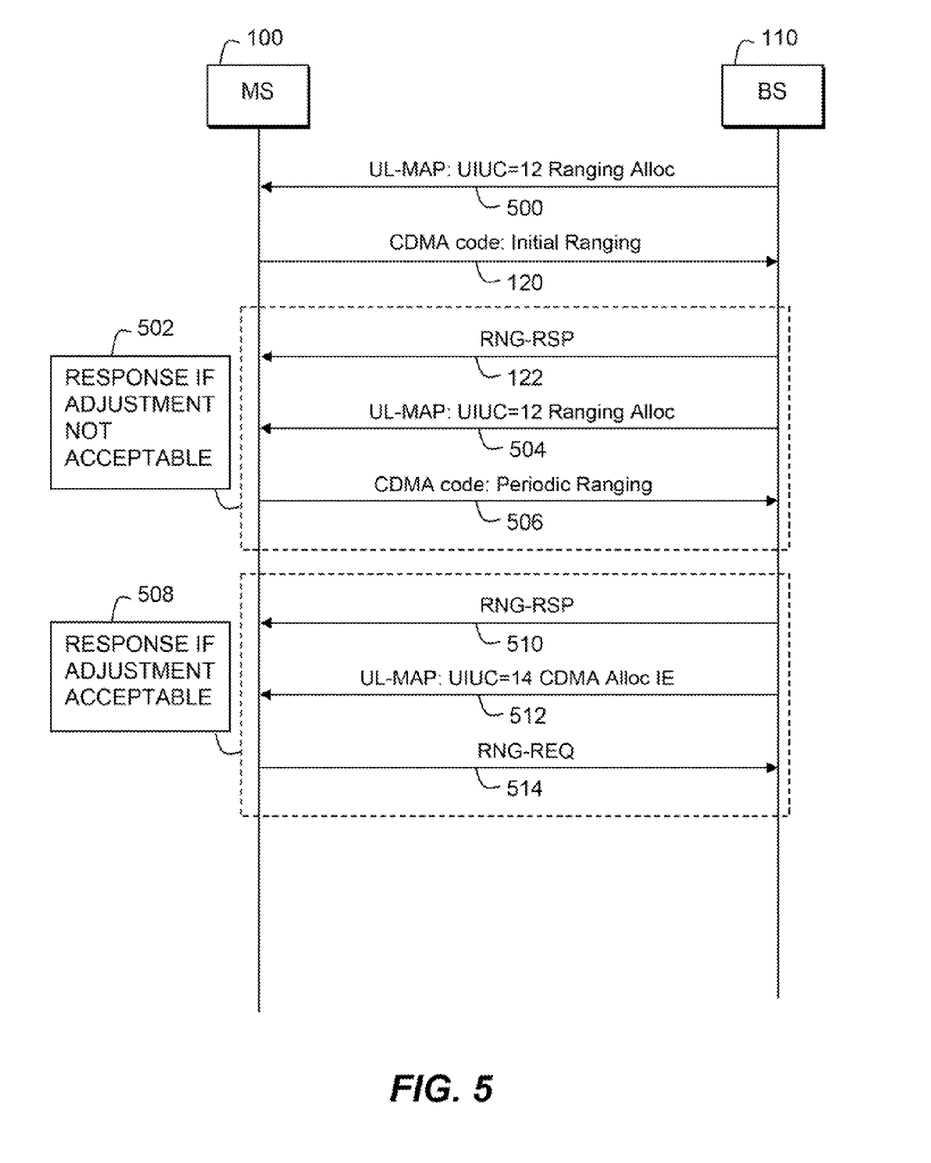
FIG. 5 illustrates a call flow, in accordance with a second embodiment of the present invention.

FIG. 5 shows a second embodiment of the present invention in a WiMAX environment. In order to communicate with a base station (BS) 110, a receiver 104 of a mobile station (MS) 100 obtains an uplink map (UL-MAP) 500 of the ranging allocations using a particular Uplink Interval Usage Code (UIUC). The processor 102 of the MS 100 selects a CDMA code sequence for itself, which is used in an initial ranging message 120 and acts as an identifier for the MS. The processor 102 then determines an available ranging slot and other transmission parameters. The processor 102 of the MS 100 directs the transmitter 106 to transmit 120 the initial ranging message using the selected slot and CDMA code sequence. It should be noted that multiple MSs may attempt to contact the BS in this manner at the same time. A receiver 114 of the BS 110 may or may not receive the initial ranging message from the MS 100, due to poor signal conditions, for example. In addition, the receiver 114 may properly receive the message 120, but the processor 112 may find the adjustments for the transmission parameters unacceptable. In any event the BS 110 must acknowledge those code sequences which it has properly identified.

In order to respond to the initial ranging messages of the MS, the processor 112 of the BS 110 assembles a list of all code sequences transmitted by the MSs requesting access that the processor was able to determine. The processor 112 responds to the initial ranging message(s) by directing the transmitter 116 to transmit a ranging response (RNG-RSP) 122 as well as an uplink map (UL-MAP) 504 of the ranging allocations for those MSs that sent an initial ranging message. The RNG-RSP 120 is sent on initial ranging connection identifier (CID) in the MAC header. The RNG-RSP 120 and UL-MAP 504 messages are addressed to the Ranging region and code that was used, and therefore all MSs are able to read it. The RNG-RSP 122 is intended for one or multiple MSs and contains the code sequence identities used by MSs requesting access. The receiver 104 of the MS(s) 100 receives the RNG-RSP 122 which is interpreted by the processor 102.

The RNG-RSP 122 message also includes time and power corrections, ranging code attributes (i.e. which code and where it was received), and a status. If the adjustments to accommodate the transmission parameters sent in the initial ranging message are acceptable to the BS 502, the RNG-RSP 122 contains a status of 'continue', and if the adjustments to accommodate the transmission parameters sent in the initial ranging message are not acceptable to the BS 508, the RNG-RSP 510 contains a status of 'success'. Also, if the adjustments to accommodate the transmission parameters sent in the initial ranging message are acceptable to the BS 502, the UL-MAP 504 contains a particular UIUC code for ranging allocations, and if the adjustments to accommodate the transmission parameters sent in the initial ranging message are not acceptable to the BS 508, the UL-MAP 512 contains a different UIUC code for CDMA allocation information elements, which provide previous ranging attributes (CDMA code, subchannels, symbols) and an allocation for a ranging request (RNG-REQ) 514.

If the MS 100 recognizes code sequence identity, used in the previous initial ranging message, in the RNG-RSP message 510 and obtains an indication that the transmission parameters adjustments are acceptable to the BS, it can send a RNG-REQ to the BS 110 for communication access. However, if the MS 100 does not recognize its identity in the RNG-RSP message 122 or obtains an indication that the transmission parameters adjustments are not acceptable to the BS, it can send its CDMA code in a periodic ranging message 506.

In accordance with this embodiment of the present invention, a flag or indicator is included in the RNG-RSP message 122 that indicates that there were no other identification codes (signatures) detected in the ranging opportunity, and therefore the MSs that were not acknowledged or had unacceptable adjustments can restart the retransmission process 120 immediately, without waiting to see if its identification code or adjustment acceptance is sent in subsequent RNG-RSP message messages planned by the BS, similar to the RACH case for LTE described above. Accordingly, this embodiment of the present invention introduces a "not acknowledged" indicator in a RNG-RSP message to indicate that this RNG-RSP message is the last transmission related to a particular ranging opportunity. If the MS is able to read this indicator and if indicator is set and MS does not detect its identifier, then the MS immediately prepares for initial ranging retransmission at the next ranging opportunity. If the MS is able to read this indicator and if indicator is set and MS does detect its identifier, then the MS can proceed with its access messages 514.

If the MS is not able to read this indicator, or if the MS can read this indicator and if indicator is not set, then the MS must wait for any other potential RNG-RSP messages before deciding that the BS did not receive its request and the MS must prepare for retransmission at the next ranging opportunity.

Figure 6:
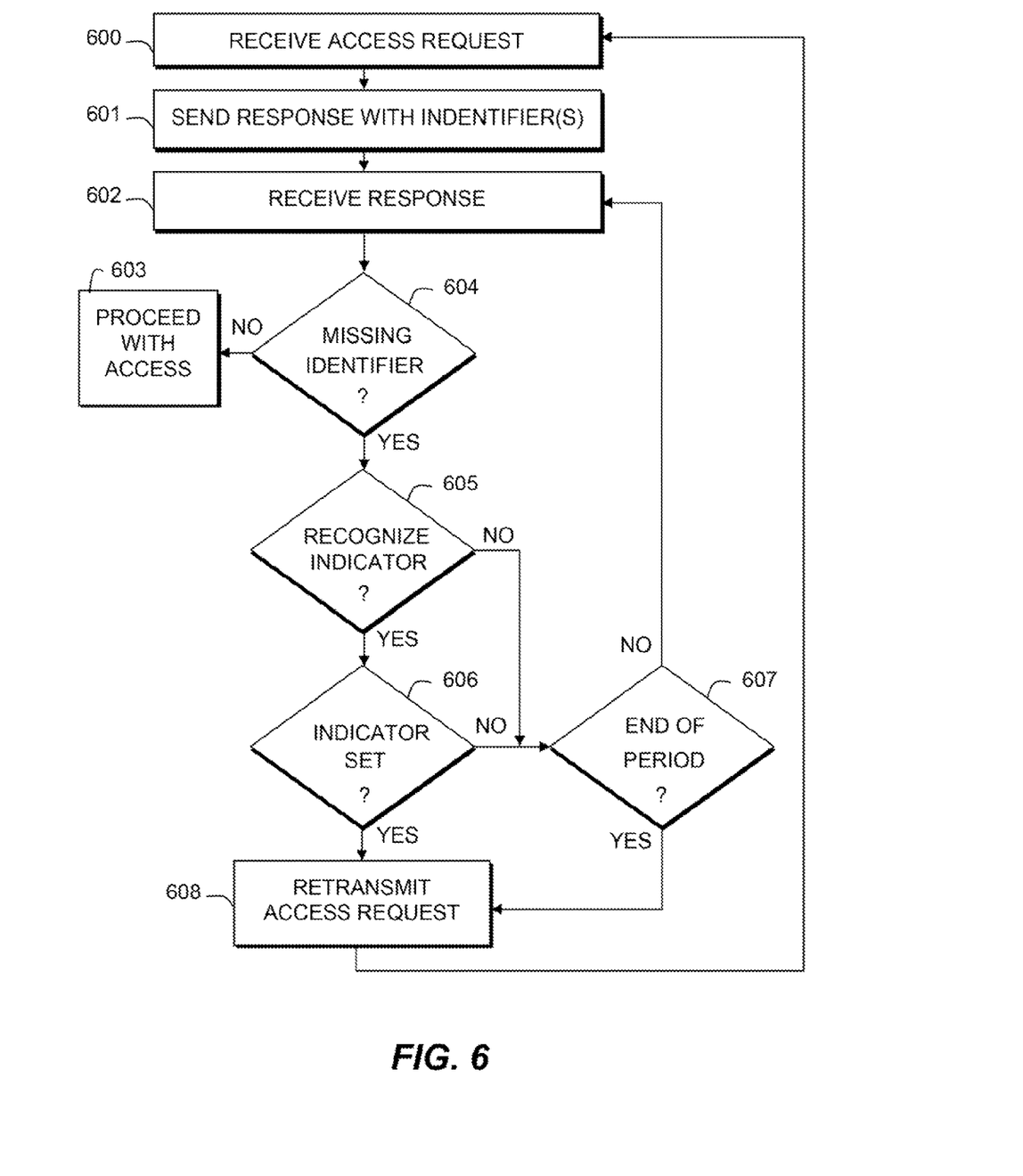
FIG. 6 comprises a flow diagram of a method, in accordance with the present invention.

FIG. 6 is a method for reducing access channel delay in a wireless communication system includes a first step 600 of an eNB receiving at least one initial access request, each initial access request having an associated identifier.

A next step 601 includes eNB sending an initial access request response that includes identifiers of any initial access requests that were received in the receiving step 600. The response also including an indicator that indicates whether any more responses with identifiers are going to be sent within a predefined time period. In the LTE system, the initial access request of the receiving step is a random access channel preamble identifier, and the response in the sending step is a random access response. In the WiMAX system, the initial access request in the receiving step is an initial ranging message, and the response in the sending step is a ranging response message. It should also be noted that an eNB can send an empty (dummy) response (RAR) without any identifiers except for possibly preamble IDs (RAPID) reserved as an "Last-message-in-window" indication. This response could just carry a Backoff Indicator or a "Last-message-in-window" indicator or both. For example, if the eNB knows it did not receive anything in a particular RACH opportunity (slot) it could be beneficial in some cases to send an empty RAR with the indicator flag turned on just in case there were some preambles sent from UE(s) that were not detected by the eNB, and that these UE(s) are now waiting for the RAR window to expire. During low loads it would make sense to do this since sending a dummy response would not create additional congestion. In addition, in the case the eNB detects a collision between multiple preambles using the same identifier sequence the eNB could send the indicator to expedite retransmission.

A next step 602 includes receiving the response;

A next step 604 includes each user equipment recognizing that a particular identifier from the initial access request is not in the response. If the identifier for a particular user equipment is present in the response, then that user equipment proceeds 603 with normal channel access, as is known in the art. If the identifier for a particular user equipment is not present in the response, then that user equipment proceeds with the next step 605.

A next step 605 includes the user equipment recognizing the indicator. If the user equipment can not recognize the indicator, such as for legacy equipment, then the user equipment must wait 607 for the next transmit opportunity (e.g. RACH opportunity in LTE) before it can retransmit 608 its access request. However, if the user equipment can detect the indicator, then that user equipment proceeds with the next step 606.

A next step 606 includes determining from the indicator that there will be no more responses with identifiers sent within the predefined time period. In other words, if the indicator is not set (i.e. there will be more responses this period), then the user equipment must wait until it receives its identifier or until the end of the predefined time period (i.e. RAR response window) 607 which ever is later, before it retransmit 608 its access request.

A next step 608 includes retransmitting an initial access request, preferably before the end of the predefined time period if the user equipment was able to recognize its missing identifier 604, detect the indicator 605, and determine that the indicator is set 606, telling the user that it will not receive its identifier anytime this period, and it can immediately retransmit its access request 608 in order to run through the process again.

Advantageously, the present invention provides a reduced delay in channel access over the prior art, pursuant to the above embodiments. In particular, providing a last-message-in-window message reduces the potential delay of channel access for data transmissions. Notwithstanding these benefits, these embodiments can be realized with only minimal changes to the relevant 3GPP, 3GPP, EUTRA, LTE, and 802.16x standards.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including use of hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use real-time services. Rather, the invention is to cover all modification, equivalents and alternatives falling within the scope of the invention as defined by the following appended claims.

What is claimed is:

1. An apparatus to be employed in a user equipment (UE), the apparatus including:
a processor to:
generate a first request to be transmitted to an eNodeB, wherein the first request is associated with an identifier and is to request access to a random access channel (RACH);
determine that a broadcast response from the eNodeB, which includes one or more random access responses (RARs), does not include a RAR with the identifier associated the first request;
determine that the broadcast response includes an indicator to indicate that the broadcast response is a last transmission related to a RACH opportunity within a predetermined time period; and
generate, based on determination that the broadcast response includes the indicator, a second request to be transmitted to the eNodeB prior to expiration of the predefined time period, the second request to request access to the RACH;
a transmitter, coupled with the processor, to transmit the first and second requests; and
a receiver, coupled with the processor, to receive the broadcast response,
wherein the indicator is a first indicator and the broadcast response further includes a second indicator that is a backoff indicator to indicate an overload condition of a cell of the eNB.

2. The apparatus of claim 1, wherein the predetermined time period corresponds to an RAR window.

3. The apparatus of claim 1, wherein the broadcast response includes a media access control message having a header, which includes the indicator, and a body.

4. The apparatus of claim 3, wherein the indicator is a bit.

5. The apparatus of claim 1, wherein the indicator is a reserved identifier that is not associated with any user equipment.

6. The apparatus of claim 1, wherein the indicator is a particular order of identifiers in the broadcast response.

7. The apparatus of claim 1, wherein the indicator is a duplicate identifier in the broadcast response.

8. The apparatus of claim 1, wherein the broadcast response includes a media access control message having a header and a body, which includes the indicator.

9. An apparatus to be employed in a user equipment (UE), the apparatus including:
a processor to:
generate a first request to be transmitted to an eNodeB, wherein the first request is associated with an identifier and is to request access to a random access channel (RACH);
determine that a broadcast response from the eNodeB, which includes one or more random access responses (RARs), does not include a RAR with the identifier associated the first request;
determine that the broadcast response includes an indicator to indicate that the broadcast response is a last transmission related to a RACH opportunity within a predetermined time period; and
generate, based on determination that the broadcast response includes the indicator, a second request to be transmitted to the eNodeB prior to expiration of the predefined time period, the second request to request access to the RACH;
a transmitter, coupled with the processor, to transmit the first and second requests; and
a receiver, coupled with the processor, to receive the broadcast response, wherein the indicator is a value within a backoff indicator field in a media access control subheader, wherein the value does not identify an overload condition of a cell of the eNodeB.

10. A method comprising:
generating a first request to be transmitted to an eNodeB, wherein the first request is associated with an identifier and is to request access to a random access channel (RACH);
determining that a broadcast response from the eNodeB, which includes one or more random access responses (RARs), does not include a RAR with the identifier associated the first request;
determining that the broadcast response includes an indicator to indicate that the broadcast response is a last transmission related to a RACH opportunity within a predetermined time period; and
generating, based on determination that the broadcast response includes the indicator, a second request to be transmitted to the eNodeB prior to expiration of the predefined time period, the second request to request access to the RACH,
wherein the indicator is a value within a backoff indicator field in a media access control subheader, wherein the value does not identify an overload condition of a cell of the eNodeB.

11. The method of claim 10, wherein the broadcast response includes a media access control message having a header, which includes the indicator as a bit, and a body.

12. The method of claim 10, wherein the indicator is a reserved identifier that is not associated with any user equipment.

13. The method of claim 10, wherein the indicator is a particular order of identifiers in the broadcast response or is a duplicate identifier in the broadcast response.

14. An apparatus to be employed in an eNodeB, the apparatus including:
a processor to:
determine one or more requests are received from one or more user equipments (UEs); and
generate a broadcast response that includes one or more random access responses (RARs); an identifier associated with at least one UE from the one more UEs; and an indicator to indicate that the broadcast response is a last transmission related to a random access channel opportunity within a predetermined period of time;
a receiver, coupled with the processor, to receive the one or more requests; and
a transmitter, coupled with the processor, to transmit the broadcast response,
wherein the indicator is a value within a backoff indicator field in a media access control subheader, wherein the value does not identify an overload condition of a cell of the eNodeB.

15. The apparatus of claim 14, wherein the indicator is a bit.

16. The apparatus of claim 14, wherein the indicator is a reserved identifier that is not associated with any user equipment.

17. The apparatus of claim 14, wherein the indicator is a particular order of identifiers in the broadcast response.

18. The apparatus of claim 14, wherein the indicator is a duplicate identifier in the broadcast response.

* * * * *